United States Patent Office 2,855,315
Patented Oct. 7, 1958

2,855,315

DRIED FRUIT JUICE FLAVORING PARTICLES AND METHOD OF MAKING THE SAME

Joseph R. Perrozzi and Grant W. Pearcy, Minneapolis, Minn., assignors to Pillsbury Mills, Inc., Minneapolis, Minn., a corporation of Delaware No Drawing. Application October 31, 1955
Serial No. 544,006

5 Claims. (Cl. 99—204)

This invention relates to flavoring particles, and more particularly to pieces of dried juice and concentrate suitable for incorporation into a food mix for subsequent cooking in moist surroundings.

The prior art shows that flavoring particles have been long incorporated into breads, cakes and the like to increase their palatability and to diversify their taste. It is relatively simple to incorporate fresh fruit particles and the like into a batter or dough just before it is baked. The particle contains most of its original moisture and cellular structure and presents little trouble if the baked product is promptly eaten, which is usually the case with such baked goods.

An entirely different problem is presented when such fruit or fruit-flavored particles are first placed in a commercial dry mix and permitted to stand for some time before the mix is subsequently sold and used. If the particles are unstabilized, they may rapidly dry out in the mix, causing the cellular structure of each particle to collapse and lose its flavor and texture. At the time the mix is remoistened and cooked or baked, the particle will take on some moisture but flavor once lost cannot be regained. Where the particles are dried prior to incorporating in a pre-mix and each such particle has a high percentage of soluble constituents, and is not stabilized, then much of the flavor will be generally dispersed throughout the baked product, and the effect of concentrated flavor particles will be lost. Often the identity of the entire particle is lost and each of them merely contributes to a general weak flavor.

Where the particle is of such character as to hold its flavor easily, such as where highly volatile flavoring essences are not predominant, and where the particle is readily dried, yet does not acquire an unpalatable hardness or toughness which persists when cooked or baked in a steamy atmosphere, then a desirable situation exists for producing a dry mix containing such particles from which a cooked or baked product can be made containing the discrete bits or particles of flavoring which lend a delightful versatility to eating enjoyment.

Unfortunately, many good flavoring particles which are otherwise suitable as an ingredient of pre-mix for cakes and the like, are so unstable and sensitive to moisture change that they will completely dissolve or disintegrate in a baked product. One such particle is produced from dried and fragmented orange juice and citrus juice in general. Another is produced from similarly treated grape juice and so on. These dried particles are tasty in their dried form but are so hygroscopic that they are better employed for reconstituting the original juice than for maintaining their integrity as discrete flavoring particles in a baked cake or the like.

We have found, however, that the very type of flavoring particle which has this hygroscopic quality can be utilized in a dry pre-mix and subsequently utilized in a moist cooked or baked product, without stabilizing the hygroscopic particle internally, but rather by carefully coating the exterior surface thereof in such a way as to prevent deterioration and disintegration. The flavor and palatability of the product is yet preserved despite the fact that the particles are maintained in moist surroundings.

It is, therefore, within the contemplation of this invention and an important object thereof to treat normally soluble pre-dried flavoring particles in such a way as to preserve their palatability and flavor and to inhibit solution and dissipating flavor when subsequently subjected to moist surroundings.

Another object of the invention is to provide a dry bakery pre-mix containing dried soluble flavoring particles which are surface-coated to prevent moisture absorption and degradation of the particles or the pre-mix within which they are contained during storage.

A further object is to provide a dried fruit particle, normally highly hydroscopic, with an exterior coating of substance which is less hygroscopic, yet capable of preserving or intensifying flavor characteristics and at the same time maintaining the integrity of the particle when baked or cooked in a product such as cake.

These and other objects and advantages of our invention will more fully appear from the following description of the method of utilization of our invention.

The type of flavoring substance which we are primarily interested in is that having a concentrated flavor and aroma characteristic of concentrated natural fruit juices. Such juices may be actually reduced to a dry crystalline state which is desirable for reconstituting fruit juices, but does not, in its hygroscopic condition, lend itself to incorporation as discrete particles in a product such as bread or cake. This invention deals with a food composition for flavoring cakes and the like wherein the desirable properties of such dried fruit juice material is retained and the undesirable attributes of the product as applied to cake mixes and cakes have been overcome by us.

One example of the solidified fruit juice which we have successfully experimented with is a vacuum-dried orange product. Tests show that the vitamin content and nutritive level of this orange product is high and the flavor is judged to be as fully acceptable as that of the frozen concentrate. Briefly, the procedure for producing the dried fruit solids in the case of oranges is to make first a concentrate of 58% solids which is immediately frozen and stored at —10° Fahrenheit. As the product is needed for further processing in the dehydrating plant, it is brought to the drying plant thawing room. Here the concentrate is poured into the mixer where the product is stabilized with sodium bisulphite. Because sulphur dioxide fumes readily escape there is virtually no detectable traces thereof in the finished product. The thawed and treated concentrate is then pumped into a dehydrated feed tank and is there maintained at 20° Fahrenheit. The concentrate is then pumped from the feed tank into a vacuum chamber and then into a stainless steel trough from which it is transferred to a drying belt having a roller, the lower portion of which is submerged in the concentrate and picks up the film thereof as it rotates. Complete dehydration of the concentrate requires but a few minutes and the dry crystals formed on the belt are removed by the action of an oscillating blade. The crystalline product is then packaged in sealed containers and is brought to a classifying room, the atmosphere of which is maintained at less than 20% relative humidity. The product is then dumped over classifying screens which separate the large crystals from the smaller and from the powder. It is the larger crystals which adapt themselves to the invention as disclosed herein.

Certain other dry products of more volatile nature were separately collected during the vacuum-drying and such may be re-added to the larger crystals in powder form to coat them or may be incorporated with other constituents which make up our invention.

The fruit crystals as prepared above are then coated with sucrose to produce a shell over the fruit crystals. We first prepare a 70% sucrose solution, using three pounds of water and seven pounds of granulated sucrose. The fruit juice crystals are then coated in a coating pan with the sucrose syrup which is dried as a shell by dusting with powdered sucrose containing 3% starch.

Since the sucrose shell is itself soluble and somewhat hygroscopic, our invention further includes the coating with a water-proof substance at the outer surface thereof. For this purpose, we prefer an edible shellac which is applied from a solution comprising ⅓ dry edible shellac and ⅔ alcohol. The shellac coating is likewise applied in the coating pan and we find that, for best results, an external coating, including both the sucrose and shellac amounts to somewhat less than that of the total weight of each particle. We find that 25% to 45% is satisfactory and 38% is preferable.

When flavoring particles prepared as above described were placed in conventional cake pre-mixes, there was no noticeable moisture-absorbing characteristics in the particles. As a matter of fact, when the pre-mix was subjected to baking conditions, the moisture at elevated temperatures still did not dissolve or distintegrate the flavoring particles. Despite the impervious nature of the treated particles, they were not unduly hard or tough when baked in a cake. The particles were highly flavorful and imparted a pleasing taste and texture to the cake. The concentrated flavor in each of the particles was clearly noticeable and of much more effect than if a similar total quantity of flavoring was distributed uniformly throughout the flour.

Substantially the same procedure as outlined above was employed for other citrus juices such as lime, lemon, tangerine and grapefruit with substantially the same results. Dried and crystallized grape juice was, likewise, experimented with and found to produce results comparable to those previously cited.

Accelerated humidity tests were applied to the coated crystals wherein the particles were exposed to 0° Fahrenheit for one hour and then exposed to an accelerated storage room. The ambient conditions of the room were such that the particles were exposed to 96° Fahrenheit and 60% relative humidity for the first 12 hours and 76° Fahrenheit and 90% relative humidity the remaining 12 hours, following which the particles were inspected for moisture absorption. In all cases, it was noted that the coated crystals after exposure to ambient extremes retained their identity and free-flowing properties.

What we claim is:

1. A stabilized flavoring particle for package mixes containing flour comprising, a discrete piece of dried and solidified fruit juice containing cellular material and having concentrated flavor and a hygroscopic nature, a sugar coating surrounding the solid piece of dried product, and a thin water-resistant outer coating protectively surrounding the entire external surface thereof.

2. A stabilized flavoring particle for package mixes containing flour comprising, a large crystal of dried and solidified fruit juice containing cellular material and having concentrated flavor and a hygroscopic nature, a sugar coating surrounding the solid piece of dried product, and a thin outer coating of edible shellac completely surrounding the entire external surface of the particle.

3. A stabilized flavoring particle for package mixes containing flour comprising, a discrete piece of dried and solidified fruit juice containing cellular material and having concentrated flavor and a hygroscopic nature, a shell surrounding the piece constructed of sucrose syrup and dry powdered sucrose, and an outer thin layer of edible shellac completely surrounding the entire surface of the particle.

4. The process of making discrete flavoring particles from natural fruit juice, stabilized against solution and dissipation of flavor when subsequently subject to moist surroundings which consists in drying and crystallizing said fruit juice materials, separating out the larger crystals from the pulverulent crystals, coating the larger crystals with sucrose syrup while maintaining the same in discrete form, drying the discrete sucrose, coated crystals and then applying a thin coating of edible shellac to said crystals in discrete form.

5. The process of making discrete flavoring particles from natural fruit juice containing cellular fruit material which consists in drying and crystallizing said fruit juice, separating from the crystals so produced, the larger crystals, pan coating said larger crystals with a sucrose syrup while maintaining the same in discrete form, drying the discrete sucrose-coated crystals by dusting the same with powdered sucrose containing a small percentage of starch and then applying a thin coating of edible shellac completely surrounding the entire surface of each particle.

References Cited in the file of this patent

UNITED STATES PATENTS

| Re. | 195 | Billings | Mar. 25, 1851 |
| | 202,944 | Holmes | Apr. 30, 1878 |
| | 364,332 | Barnes | June 7, 1887 |
| | 1,686,670 | Leo | Oct. 9, 1928 |
| | 1,810,276 | Jameson et al. | June 16, 1931 |
| | 1,942,212 | Heseltine | Jan. 2, 1934 |
| | 2,092,273 | Cosler | Sept. 7, 1937 |
| | 2,367,131 | Leo et al. | Jan. 9, 1945 |
| | 2,437,104 | Lee | Mar. 2, 1948 |
| | 2,710,809 | Andrews et al. | June 14, 1955 |